W. BRYANT.
Bee Hive.
No. 2,890.
Patented Dec. 21, 1842.
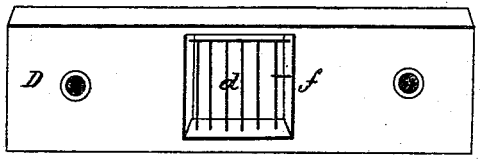
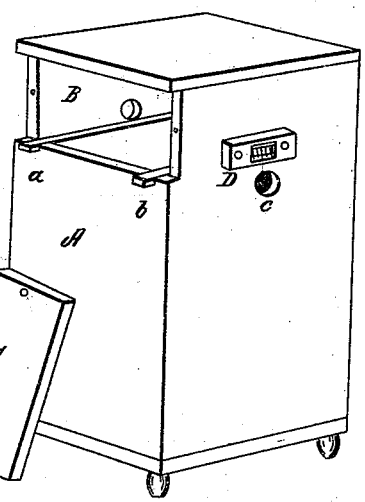
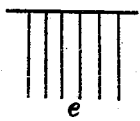

UNITED STATES PATENT OFFICE.

WM. BRYANT, OF DAVIDSON COUNTY, TENNESSEE.

BEEHIVE.

Specification of Letters Patent No. 2,890, dated December 21, 1842.

*To all whom it may concern:*

Be it known that I, WILLIAM BRYANT, of the county of Davidson and State of Tennessee, have invented a new and useful Improvement in the Art of Managing Bees, the objects of which are to get their honey without killing or forcibly driving them from it, and to avoid the danger of getting stung in taking their honey; and I hereby declare that the following is a full, clear, and exact description.

The nature of my invention, consists in compelling the bees to exclude themselves from that part of their honey which it is desired to take from them, by placing a gate (which with the wood in which it is fixed I call the bee-trap) across their passage, which gate they can pass in leaving their honey, but cannot repass it to return to their honey.

To enable others skilled in the art, to make and use my invention, I proceed to describe its construction and operation.

I disclaim making any improvement in the bee-hive, but give a description of one to which my invention can conveniently be applied, and the manner in which the trap is used on it; reference being had to the annexed drawings, making a part of this specification; in which—

Figure 1 is a perspective view of the bee-hive, showing the manner in which the bee-trap is attached to the hive; Fig. 2 is a front view of the bee-trap, showing the manner in which the gate is suspended across the bee-passage; Fig. 3 is a front view of the gate.

I make the hive A, B, about twenty inches high, and thirteen inches square inside, and divide it into two parts by fastening a plank across it about five inches below the head: To give a passage for the bees from one division of the hive to the other, the plank lacks about an inch at each end of reaching to the sides of the hive: When the honey is to be taken from the bees, these passages are closed with a thin strip of wood or metal, passed along each from the back to the front of the hive, the ends of the strips are shown at *a* and *b* Fig. 1. The lower division A, is the part in which the bees are allowed to remain and rear the young bees: A back view of the upper division, which is represented as open, is shown at B, this is the part where the bees deposit the honey which is to be taken from: C is the door of the upper division. In each side of the hive, near the top in the lower division of it, and near the bottom in the upper division, a hole of about an inch in diameter is made; the lower hole in the side in view, is shown at *c* in Fig. 1; the upper hole is hid by the bee-trap D shown as it is attached to the hive; these holes are used as bee-passages when excluding the bees from their honey: The hive has a passage in front at the bottom, as hives commonly have, for the bees to pass in and out at in their ordinary labors.

To make the bee-trap, I use a piece of wood D about three inches long one inch thick and an inch and eighth wide; across, at the middle of this piece of wood, from one edge, and extending to within an eighth of an inch of the other edge, a piece is cut out, of about an inch square, this cut or opening *d* is called the bee-passage in the trap; across this passage, about the middle of it the gate is suspended, and then, on the upper edge, or that in which the cut is made in this piece of wood, another very thin piece is glued: The gate *e* is made by attaching at their upper ends, small wire teeth about seven eighths of an inch long to a light wire axle; the axle is about an eighth of an inch longer than the passage in the trap is wide; across this passage the gate is suspended; the teeth of the gate are just near enough together to prevent a bee passing between them, and such a number of teeth in the gate as to come within one tenth of an inch of each side of the passage; the lower ends of the gate teeth when it is suspended, reach near, but not quite to the bottom of the passage; a small peg *f*, in one side of the bee-passage, prevents the teeth of the gate from turning or opening inward, or toward the hive, but it can freely open outward, or from the hive; near each end of the bee-trap there is a hole through it, and with small wood screws or tacks, through these holes when it is used, it is fastened to the side of the hive.

The manner of operation is as follows: A swarm of bees is hived in, or put into the before described hive, in the common manner; the holes in the sides of it are closed, and the passages between the lower and upper divisions left open. When the bees have filled the upper division with comb and honey, and it is desired to remove the bees from it, with the strips before named close the passages between the divisions of the hive, and open the holes on one side of it; then with wood screws or tacks, fasten the trap to the side of the hive in such manner, that the bee-passage in the trap, will fit (or correspond with) the upper hole or bee-passage in the part B of the hive, and so that the gate is freely suspended on its axle, and that the teeth of it can rise or open only outward or from the hive. Either one or two bee-traps can be used on the hive at the same time; when two are used, the arrangement of the second one which is to be placed on the opposite side of the hive, should be the same as for the first, above described. The passages between the lower and upper divisions of the hive being closed, the bees in the upper division can only escape or leave that part through the hole in the side of it; and in passing out there, they are compelled to go through the bee-passage in the trap; in it, they go against the teeth of the gate which they push or raise upward and outward and passing out under the gate, they leave the upper division of the hive; the gate then drops down on back to its former position, and as it is prevented by the peg $f$ from rising or swinging inward, the bees cannot repass it and by that passage again enter the upper division of the hive; they then go into the lower division through the hole $c$, or at the common entrance at the bottom in front. When the bees have left the upper division of the hive, the door in the back of it should be opened or taken off, and the comb and honey taken out; the door then again fastened on, the trap taken off, the holes in the sides of the hive closed, and the passages between the lower and upper divisions of the hive opened; the bees will again go through the passages from the lower division of the hive to the upper one, and resume their ordinary labors there.

What I claim as my invention, and desire to secure by Letters Patent, is,

Applying the bee-trap across the bee-passage in that manner, that the teeth of the gate, can rise, or open only outward from the hive, and permit the bees to exclude themselves from their honey.

WILLIAM BRYANT.

Witnesses:
W. TANNEHILL,
B. R. McKENNIE.